US007676752B2

(12) United States Patent
Bhesania et al.

(10) Patent No.: US 7,676,752 B2
(45) Date of Patent: Mar. 9, 2010

(54) SYSTEM AND METHOD TO SPECIFY DEVICE SPECIFIC USER INTERFACE INFORMATION IN THE FIRMWARE OF A USB DEVICE

(75) Inventors: Firdosh K. Bhesania, Kirkland, WA (US); Kenneth D. Ray, Seattle, WA (US); Stephane St. Michel, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 11/076,624

(22) Filed: Mar. 10, 2005

(65) Prior Publication Data

US 2005/0160190 A1    Jul. 21, 2005

Related U.S. Application Data

(63) Continuation of application No. 09/745,385, filed on Dec. 21, 2000, now Pat. No. 7,127,678.

(51) Int. Cl.
*G06F 3/00* (2006.01)
*G06F 13/00* (2006.01)

(52) U.S. Cl. .......................................... 715/744; 710/42
(58) Field of Classification Search ................. 715/747, 715/745, 746, 965–966, 771; 710/42, 8, 710/10, 16, 65; 707/227, 250; 725/126
See application file for complete search history.

(56) References Cited

U.S. PATENT DOCUMENTS

| | | | |
|---|---|---|---|
| 5,809,329 A | 9/1998 | Lichtman et al. | |
| 5,835,791 A | 11/1998 | Goff et al. | |
| 6,067,628 A | 5/2000 | Krithivas et al. | |
| 6,085,265 A | 7/2000 | Kou | |
| 6,211,870 B1 | 4/2001 | Foster | |
| 6,218,969 B1 | 4/2001 | Watson et al. | |
| 6,219,736 B1 | 4/2001 | Klingman | |
| 6,233,640 B1 | 5/2001 | Luke et al. | |
| 6,249,825 B1 | 6/2001 | Sartore et al. | |
| 6,251,014 B1 | 6/2001 | Stockdale et al. | |
| 6,256,687 B1 | 7/2001 | Ellis et al. | |
| 6,260,084 B1 | 7/2001 | Wilson et al. | |
| 6,263,392 B1 | 7/2001 | McCauley | |
| 6,268,845 B1 | 7/2001 | Pariza et al. | |
| 6,289,466 B1 | 9/2001 | Bayramoglu et al. | |

(Continued)

FOREIGN PATENT DOCUMENTS

| | | |
|---|---|---|
| JP | 2000194654 | 7/2000 |
| WO | WO9906910 | 2/1999 |

OTHER PUBLICATIONS

"Universal Serial Bus Common Class Specification" SystemSoft Corporation, Intel Corporation; Dec. 16, 1997; 16 pages.
"USB Device Framework"; Chapter 9 USB Serial Bus Specification Revision 1.1; Sep. 1998; pp. 175-206.
Canosa, "Understanding USB: Host-Side Issues", Proc Annual Embedded Systems Conf, Mar. 1998, vol. 1, pp. 527-554.

*Primary Examiner*—Steven P Sax
(74) *Attorney, Agent, or Firm*—Lee & Hayes, PLLC

(57) ABSTRACT

Systems and methods to specify device specific user interface information in firmware of a USB device are described. In one aspect, a USB device receives a host-specific device request from an application executing on a computing device coupled to the USB device. The USB device identifies a host-defined string descriptor defined by the application. The host-defined string descriptor is stored in firmware of the USB device.

19 Claims, 4 Drawing Sheets

U.S. PATENT DOCUMENTS

| | | |
|---|---|---|
| 6,343,260 B1 | 1/2002 | Chew |
| 6,366,967 B1 | 4/2002 | Wagner |
| 6,381,666 B1 | 4/2002 | Kejser et al. |
| 6,389,495 B1 | 5/2002 | Larky et al. |
| 6,389,560 B1 | 5/2002 | Chew |
| 6,394,900 B1 | 5/2002 | McGlone et al. |
| 6,408,351 B1 | 6/2002 | Hamdi et al. |
| 6,443,839 B2 | 9/2002 | Stockdale et al. |
| 6,480,801 B2 | 11/2002 | Chew |
| 6,484,219 B1 | 11/2002 | Dunn et al. |
| 6,505,267 B2 | 1/2003 | Luke et al. |
| 6,538,668 B1 | 3/2003 | Ruberg et al. |
| 6,584,601 B1 | 6/2003 | Kodosky et al. |
| 6,591,310 B1 | 7/2003 | Johnson |
| 6,633,933 B1 | 10/2003 | Smith et al. |
| 6,754,811 B1 * | 6/2004 | Cato et al. ............. 712/227 |
| 6,779,004 B1 | 8/2004 | Zintel |
| 6,810,481 B1 | 10/2004 | Kawade et al. |
| 6,832,273 B2 | 12/2004 | Ray et al. |
| 6,930,709 B1 * | 8/2005 | Creamer et al. .......... 348/211.3 |
| 6,934,774 B1 * | 8/2005 | Sundaram et al. ............ 710/19 |
| 6,965,368 B1 | 11/2005 | Andrews et al. |
| 2003/0014766 A1 | 1/2003 | Dinwiddie et al. |
| 2005/0211788 A1 | 9/2005 | Drabczuk et al. |
| 2007/0124839 A1 | 5/2007 | Schulz et al. |
| 2007/0124841 P1 | 5/2007 | Lyrene |

* cited by examiner

SYSTEM AND METHOD TO SPECIFY DEVICE SPECIFIC USER INTERFACE INFORMATION IN THE FIRMWARE OF A USB DEVICE

RELATED APPLICATIONS

This application is related to U.S. patent application Ser. No. 09/745,385, titled "System and Method to Specify Device Specific User Interface Information in the Firmware of a USB Device", filed Dec. 21, 2000, hereby incorporated by reference.

TECHNICAL FIELD

The following description relates generally to the use of peripheral devices with software applications. More specifically following description relates to the use of device-specific information and resources with such software applications.

BACKGROUND

The Universal Serial Bus (USB) is a cable bus that supports data exchange between a host computer and a wide range of simultaneously accessible peripheral devices. The attached peripheral devices share USB bandwidth through a host-scheduled, token-based protocol. The bus allows peripherals to be attached, configured, used, and detached while the host and other peripherals are in operation.

The USB is defined by a specification that is approved by a committee of industry representatives. The specification covers all aspects of USB operation, including electrical, mechanical, and communications characteristics. To be called a USB device, a peripheral must conform to this very exacting specification.

Descriptors are used in a USB system to define "device requests" from a host to a peripheral device. A device request is a data structure that is conveyed in a "control transfer" from the host to the peripheral device. A control transfer contains the following fields:

bmRequestType—a mask field indicating (a) the direction of data transfer in a subsequent phase of the control transfer; (b) a request type (standard, class, vendor, or reserved); and (c) a recipient (device, interface, endpoint, or other). The primary types of requests specified in the "request type" field are the "standard" and "vendor" types, which will be discussed below.

bRequest—a request code indicating one of a plurality of different commands to which the device is responsive.

wValue—a field that varies according to the request specified by bRequest.

wIndex—a field that varies according to request; typically used to pass an index or offset as part of the specified request.

wLength—number of bytes to transfer if there is a subsequent data stage.

All USB devices are supposed to support and respond to "standard" requests—referred to herein as "USB-specific" requests. In a USB-specific request, the request type portion of the bmRequestType field contains a predefined value indicative of the "standard" request type.

Each different USB-specific request has a pre-assigned USB-specific request code, defined in the USB specification. This is the value used in the bRequest field of the device request, to differentiate between different USB-specific requests. For each USB-specific request code, the USB specification sets forth the meanings of wValue and wIndex, as well as the format of any returned data.

USB devices can optionally support "vendor" requests— referred to herein as "device-specific" requests. In a device-specific request, the request type portion of the bmRequestType field contains a predefined value to indicate a "vendor" request type. In the case of device-specific requests, the USB specification does not assign request codes, define the meanings of wValue and wIndex, or define the format of returned data. Rather, each device has nearly complete control over the meaning, functionality, and data format of device-specific requests. Specifically, the device can define its own requests and assign device-specified request codes to them. This allows devices to implement their own device requests for use by host computers, and provides tremendous flexibility for manufacturers of peripherals.

The inventors have discovered a need for a similar feature that would benefit various hosts, application programs, host operating systems, hardware manufacturers (OEMs), and Independent Hardware Vendors (IHVs). Specifically, designers of application programs and operating systems would value the opportunity to define their own device requests (and the associated responses), and to have such requests supported in a uniform way by compatible peripherals. Moreover, OEMs and IHVs (makers and distributors of USB devices) would value the ability to supply additional USB device-specific information to the hosts, application programs and host operating systems in response to such device requests. However, the different request types supported in the bmRequestType field of a USB device request do not include a "host" type of request.

As an example of this need for a host type of request, consider that a typical USB device installation scenario typically involves customer use of installation media such as OEM/IHV supplied installation disks (e.g., a floppy disk) and/or setup computer program applications. Such installation media are generally shipped with the device or made available over the Internet. Installation media typically provide device-specific settings and resources such as: (a) a device driver to control the device; (b) one or more user interface elements; and (c) an information file (e.g., an ".inf" file) to specify names and locations of the setting and resources. Such user interface (UI) elements include, for example, icons, fonts, pictures, labels, help pages, Universal Resource Locator (URL) Internet links, and the like.

Upon installation, a USB device typically provides an operating system with USB standard class and subclass codes which are used to determine whether a generic, or default device driver can be used to control the device. If so, a special OEM/IHV supplied device driver may not be necessary to control the device. Thus, it is often unnecessary for customers to install the device drivers provided on the installation media for the device to function properly upon being attached.

However, as USB devices gain popularity, OEMs/IHVs typically want to load other device-specific brand information to allow an operating system to present a shell or user interface information that is appropriate to a particular USB device. Such information includes brand icons, fonts, pictures, labels, help pages, Universal Resource Locator (URL) Internet links, and the like. Thus, even though an installation media supplied device driver may not be required, an installation media including an information file still typically needs to be distributed with the device to specify any device-specific shell or user interface information. (Hereinafter, "shell" and/ or "user interface" information is often referred to generally as "user interface", or "UI" information).

One of the benefits of using a USB device is the reduced the amount of interaction typically required of a user to attach and configure a device. This ease of use has typically reduced the amount of device installation related customer support that OEMs/IHVs have needed to provide. Thus, when a default device driver can be used to control a device, it would be beneficial (both in terms of customer ease of use and in terms of the amount of customer support typically required) if installation media such as installation disks or setup programs were not required to be distributed to specify device-specific UI information. Rather, an operating system could query a device for this additional device specific information. Unfortunately, because host-specific USB requests are not provided or considered by the USB specification, there are no standards that allow a vendor to provide additional USB device-specific information in a USB device in a format that is determined by an operating system.

Accordingly, the invention arose out of concerns associated with providing a host-specific device request that solves the problems described above.

SUMMARY

Systems and methods to specify device specific user interface information in firmware of a USB device are described. In one aspect, a USB device receives a host-specific device request from an application executing on a computing device coupled to the USB device. The USB device identifies a host-defined string descriptor defined by the application. The host-defined string descriptor is stored in firmware of the USB device.

DETAILED DESCRIPTION

The following description sets forth a specific embodiment of a system and procedure that incorporates elements recited in the appended claims. The embodiment is described with specificity in order to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary System

Figure 1:
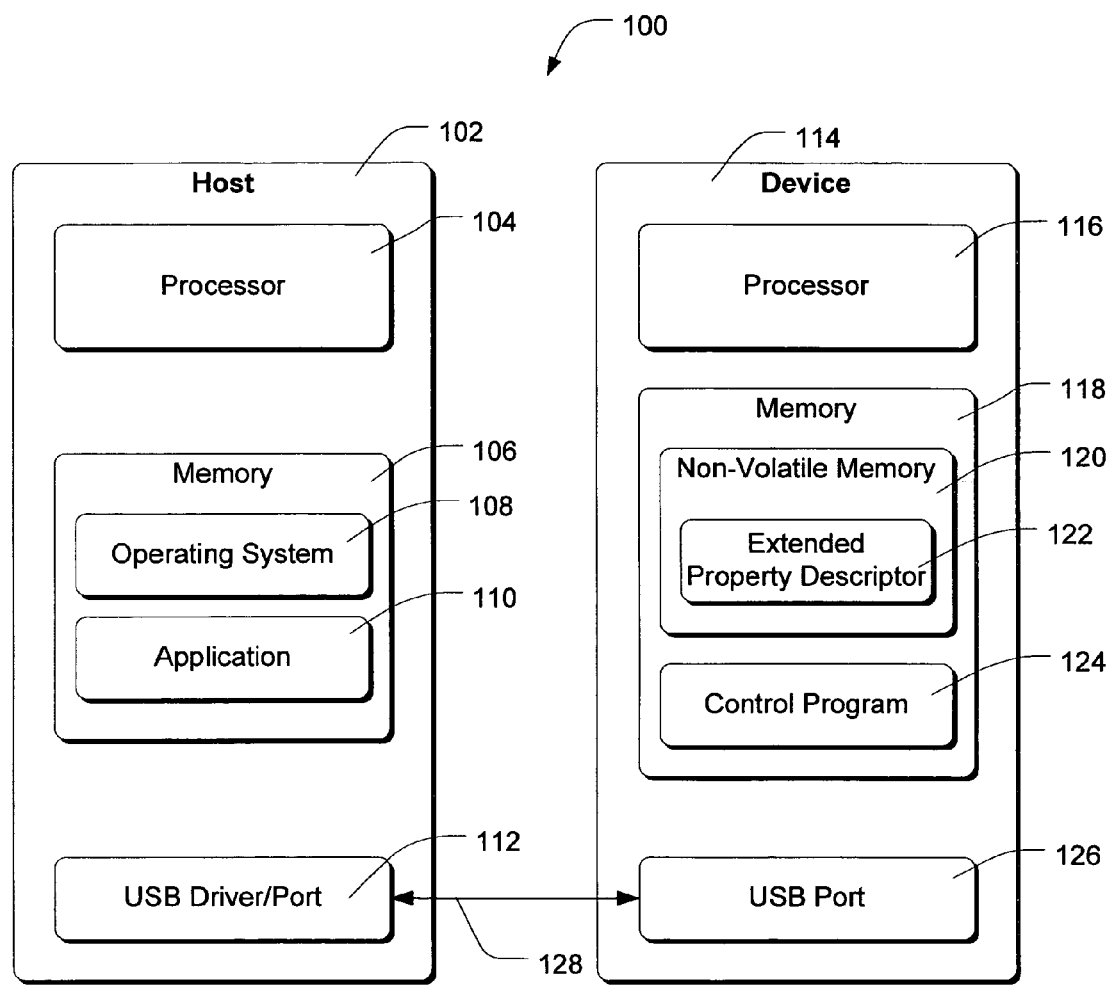
FIG. 1 is a block diagram of an exemplary host/peripheral USB system.

FIG. 1 shows a system 100 wherein device-specific settings and resources are stored on the USB device's firmware in a format specified by an operating system. These settings and resources are made available to the operating system and applications through a host-specified device request. Thus, the system and procedure of this implementation simplifies device installation scenarios and allows operating systems to identify an attached USB device and/or provide user interfaces that are appropriate for the device.

System 100 is compatible with the Universal Serial Bus (USB) specifications. These specifications are available from USB Implementers Forum, which has current administrative headquarters in Portland, Oreg. (current Internet URL: www.usb.org).

System 100 includes a host computer 102 and a USB peripheral device 114. The respective functionality of the computer and peripheral device is embodied in many cases by computer-executable instructions, such as program modules, that are executed by respective processors. Generally, program modules include routines, programs, objects, components, data structures, etc. that perform particular tasks or implement particular abstract data types.

Computer 102 is a conventional desktop PC or other type of computer. Computer 102 has one or more processors 104 and one or more forms of computer-readable memory media 106 such electronic memory, magnetic storage media, optical storage media, or some other type of data storage. Programs are stored in memory 106 from where they are executed by processor 104. In this example, such programs include an operating system 108 such as the Microsoft "Windows"® family of operating systems. The operating system provides various system services to one or more application programs 110 running on the computer.

The computer also has a USB communications driver and port 112. The USB port is supported by operating system 108. To communicate with a USB device, an application program 110 makes high-level calls to system services provided by the operating system. The system services take care of lower level communications details, and return requested information to the application program.

Peripheral device 114 is one of any number of different types of USB devices such as a data storage device, a digital camera, a scanner, a joystick, game pad, steering unit, mouse, stylus, digital speaker, microphone, display device, and the like. Peripheral device 114 has one or more processors 116 and one or more forms of computer-readable memory media 118, including at least some form of non-volatile memory media 120.

The peripheral device 114 has a USB port 126 and communicates with computer 102 via a USB communications medium 128. The peripheral device also has operating logic 124, which is executed by processor 116 to detect control actuation and for communicating with computer 102 across communication path 128.

The peripheral device 114 responds to requests from the host computer 102 across the communication path 128. These requests are made using control transfers where setup packets (not shown) are exchanged. The USB device returns descriptors in response to exchanging such setup packets. Although the USB Specification defines a number of different standard, class and vendor specific descriptors, an extended property descriptor 122 is not defined in the USB specification. The extended property descriptor includes UI information that pertains to the peripheral device. The UI information can be in any format such as a format specified by an operating system vendor. The extended property descriptor allows OEMs/IHVs to store device specific UI information such as icons, fonts, pictures, labels, help pages, Universal Resource Locator (URL) Internet links, and the like, in non-volatile memory 118 of the device.

In this implementation, prior to using the peripheral device, the computer sends a host-specific request to the peripheral device requesting device-specific UI information corresponding to the peripheral device. Such device specific UI information can be used, for example, to influence the behavior of an operating system UI shell, or to influence the behavior of other non-kernel components.

For example, a camera that exposes a "Volume" interface (a type of a disk storage device interface), is typically represented by an operating system such as a Microsoft "Windows"® operating system, as a disk storage device such as a logical drive. However, by accessing the extended property descriptor 122 through a host-specific device request, the operating system can obtain additional information that corresponding to the camera. This additional information allows the operating system to display a more particular, or "device-centric" interface that illustrates the device as a "camera", rather than merely illustrating the device as a diskstorage device. Hereinafter, such UI information is often referred to as a device's "extended properties", or "properties".

In response to the host-specific request, the peripheral device 114 provides the extended property descriptor 122 to a requestor such as the host computer 102. Using the extended property descriptor, the requestor locates data corresponding to the peripheral device 114, and extracts the UI information. The operating system can use the UI information for any number of purposes such as to display text or "special names" that correspond to the device, icons, informational URLs, and the like.

The operating system 108 optionally stores the UI information provided by the extended configuration descriptor into a configuration file (not shown) such as a registry provided by a Microsoft Windows® operating system. The stored information can be subsequently accessed by other computer program applications.

Exemplary Procedure to Obtain a Device Specific Request Code

Figure 2:
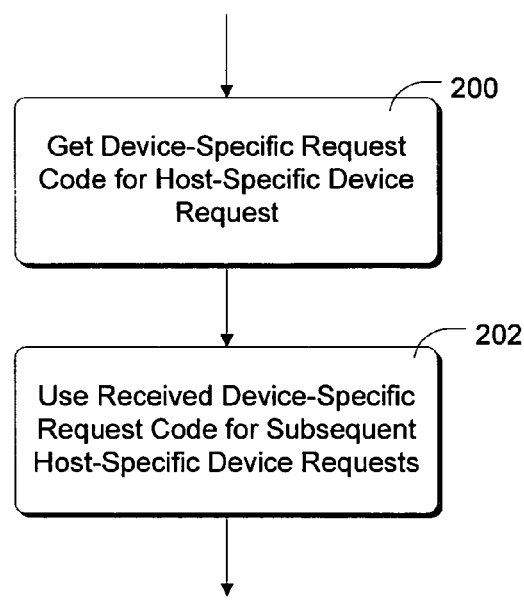
FIG. 2 shows top-level methodological aspects of an exemplary procedure to obtain a device-specific request code for computer to use when making a host-specific device request.

FIG. 2 shows top-level methodological aspects of an exemplary procedure to obtain a device-specific request code for computer to use when making a host-specific device request. Generally, a new, non-USB-specific device request is defined for use with various USB peripherals. This request is referred to herein as a host-specific device request. Because of the described methodology, the host-specific device request can be defined by the manufacturer of an operating system or application program, and can then be made available to peripheral vendors so that they can support and respond to the newly defined request. As an example, an OS manufacturer might define a new descriptor allowing peripherals to return device-specific data and resources to an operating system in a data format that is determined by the operating system. This would allow the operating system to use a single device request to obtain this information from various different peripherals (assuming those peripherals are configured to support the new device request).

In an initialization phase 200, the host sends a request to the peripheral in the form of a USB-specified device request. The request is for a device-specific request code—of the device's choosing—that will be subsequently be used as the request code for the host-specific device request.

Once this request code is obtained, it is used in a subsequent phase 202 to initiate the host-specified device request to obtain the extended property descriptor 122 of FIG. 1. Specifically, the host specifies the request code as the bRequest value in a control transfer. The actual protocol of this device request (meanings of bIndex, bValue, and the like) is as specified in the definition of the host-specific device request. Phase 202 is repeated as desired during subsequent operation, without repetition of initialization phase 200.

Figure 3:
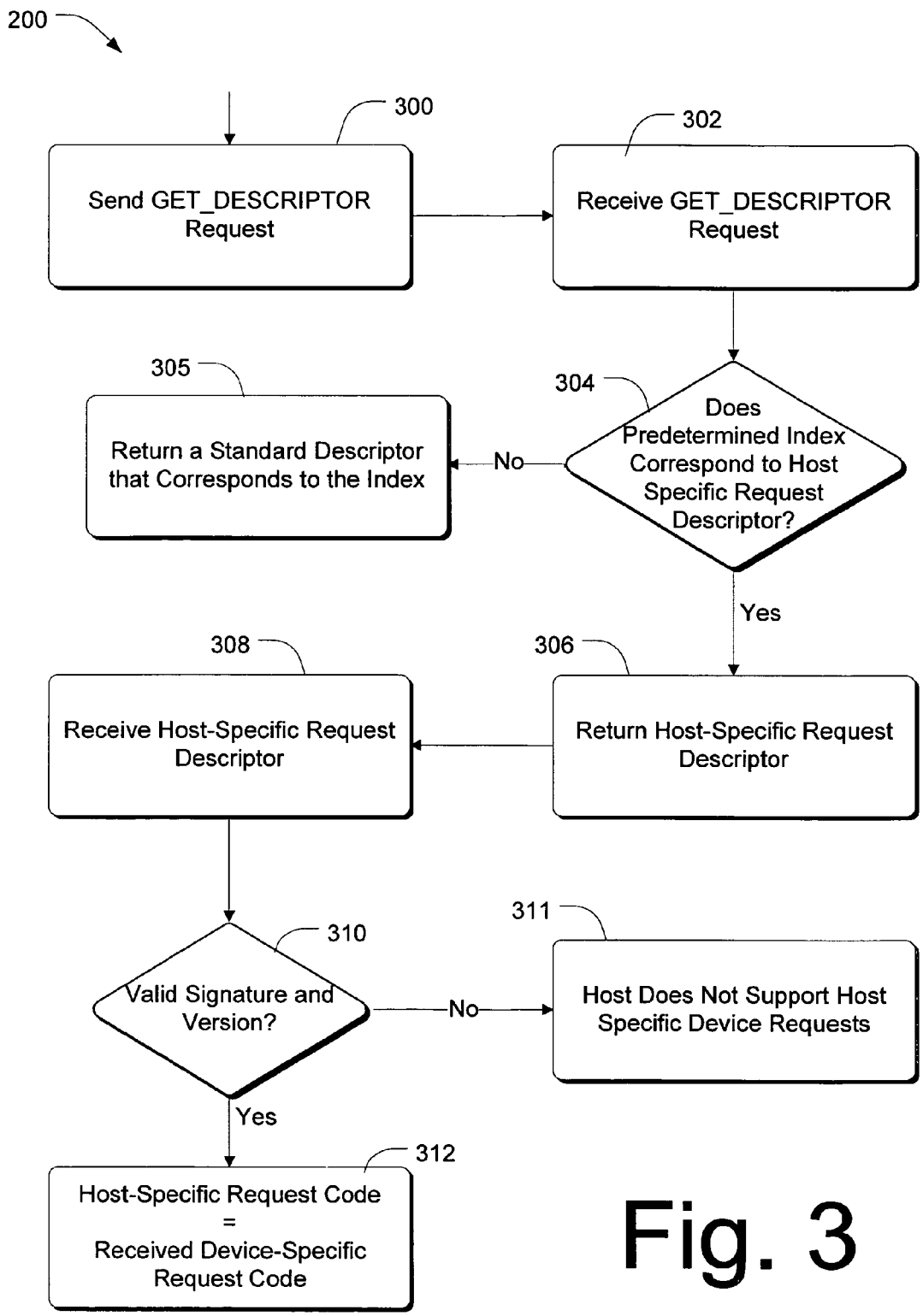
FIG. 3 is a flowchart diagram that shows detailed aspects of an exemplary procedure to obtain a device-specific request code.

FIG. 3 shows more details regarding the initialization phase 200. The host performs an action 300 of sending a GET_DESCRIPTOR device request to the peripheral device. The GET_DESCRIPTOR device request is a standard, USB-specific request, identified in a control transfer by the GET_DESCRIPTOR request code (bRequest=GET_DESCRIPTOR). The fields of the control transfer (discussed above in the background section) have values as follows:

bmRequestType=10000000 (binary), indicating a "device-to-host" transfer, a "standard" or "USB-specific" type request, and a device recipient.

bRequest=GET_DESCRIPTOR. This is a constant (six) defined by the USB specification wValue=03EE (hex). The high byte (03) indicates that the request is for a "string" descriptor, and the low byte is an index value that is predefined as a constant in the definition of the host-specified device request. In this example, it has been defined as EE (hex), but could be predefined as any other value.

wIndex=0.

wLength=12 (hex). This is the length of a host-specific request descriptor that will be returned in response to this request. In the described example, the length is 12 (hex).

data—returned host-specific request descriptor.

A compatible USB device is configured to respond to a request such as this (where wValue=03EE (hex)) by returning a host-specific request descriptor such as the extended property descriptor 122 of FIG. 1. The extended property descriptor is not defined by the USB standard, but has fields as defined in the following discussion. The host-specific request descriptor designates a device-specific request code that will work on this device to initiate the host-specific request code. In other words, the manufacturer of the device can select any device-specific request code, and associate it with an implementation of the host-specific device request.

More specifically, the device receives the GET_DESCRIPTOR device request (block 302) and performs a decision 304 regarding whether the index value (the second byte of wValue) corresponds to the predetermined value (EE (hex)). This predetermined value is a value that is chosen to be used specifically for this purpose.

If the index value does not correspond to the predetermined value, at block 305 the device responds in an appropriate way, usually by returning some other descriptor that corresponds to the index value. If the index value does correspond to the predetermined value, an action 306 is performed of returning the host-specific request descriptor to the host.

The host-specific request descriptor includes, for example, the following fields:

bLength—the length of the descriptor (12 (hex) in this example).

bDescriptorType—the type of descriptor (string type in this example).

qwSignature—a signature confirming that this descriptor is indeed a descriptor of the type requested. The signature optionally incorporates a version number. For example, in the described example MSFT110 indicates that this descriptor is for an "MSFT" host-specific device request, version "100" or 1.00.

bVendorCode—the device-specific request code that is to be associated with the host-specified device request.

bPad—a pad field of one byte.

The host receives the host-specific request descriptor (block 308) and then performs an action 310 of checking or verifying the signature and version number found in the qwSignature field. The correct signature confirms that the device is configured to support host-specific request codes. If either the signature or version number is incorrect, the host assumes at block 311 that the device does not support host-specific request codes, and no further attempts are made to use this feature.

The signature field of the host-specific request descriptor block is what provides backward compatibility. A non-compatible device (one that doesn't support host-specific request codes) might use the predetermined wValue 03EE (hex) to store some other string descriptor, which will be returned to the host without any indication of problems. However, this will become apparent to the host after it examines the data in the location where the signature is supposed to be. If the signature is not found, the host knows that the returned descriptor is not of the type requested, and will assume that the device does not support host-specific request codes.

If the signature and version are confirmed in block 310, the host at block 312 reads the device-specific request code from the bVendorCode field, and uses it in the future as a host-specific request code, to initiate the host-specific device request. When using the device, the host sends the host-specific device request by specifying the obtained device-specific request code as part of a control transfer. The device responds by performing one or more predefined actions or functions that correspond to the host-specific device request, in accordance with the specification of the host-specific device request.

The host-specific device request itself is in the format of a normal USB control transfer, including the fields discussed in the "Background" section above. The bRequest field is set to the value of the bVendorCode field of the host-specific request descriptor, which was earlier obtained from the peripheral device. The bmRequestType field is set to 11000001 (binary), indicating a device-to-host data transfer, a "vendor" or device-specific request type, and a device recipient.

The wValue and wIndex fields are used as defined by the definition of the host-specific device request. The wLength field indicates the number of bytes to transfer if there is a subsequent data transfer phase in the device request.

In a current implementation of this system, the host-specific device request is used to request one of a plurality of available host-defined string descriptors from the device. The wIndex field of the host-specific device request indicates which of the plurality of strings are to be returned. The device returns the descriptor referred to by wIndex.

The techniques described above allow an operating system designer to specify informational descriptors that devices can implement to provide additional data about themselves—data that is not directly addressed by the USB specification. For example, the techniques described above advantageously allow an operating system designer to specify the extended property descriptor 122 of FIG. 1, which is described in greater detail below in reference to FIG. 4 and Tables 1-2. Moreover, the techniques provide these advantages while retaining backward compatibility and without requiring changes to the USB specification.

Exemplary Data Structures

Figure 4:
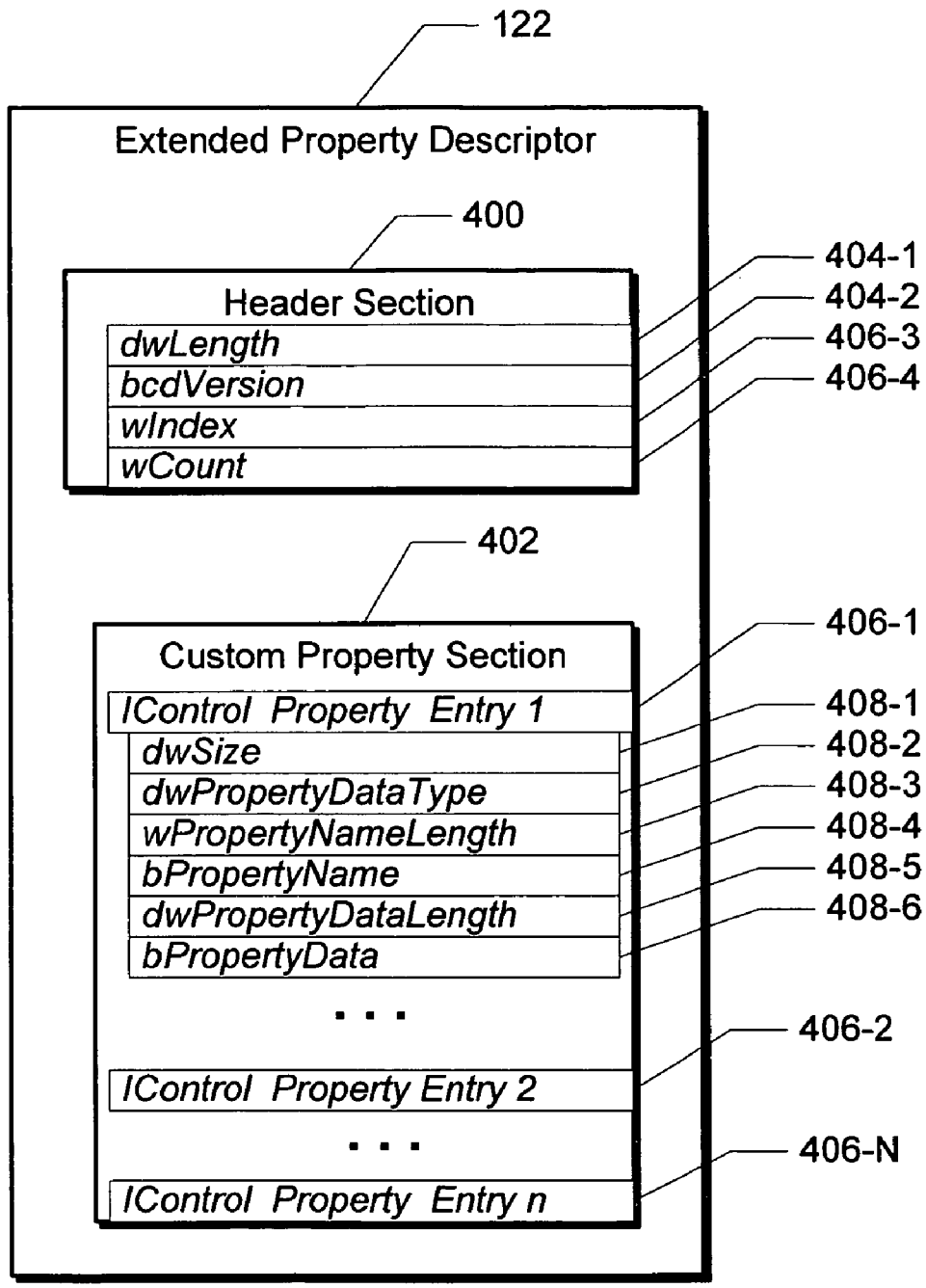
FIG. 4 is a block diagram that shows elements of an exemplary data structure of a property descriptor.

FIG. 4 shows elements of an exemplary data structure of property descriptor 122. The property descriptor is an example of a host-specific request descriptor as described above. The property descriptor includes a header section 400 and a custom property section 402. The header section includes a number of elements 404 that describe the custom property section. The custom property section includes information corresponding to one or more control properties 406. Each instance of a control property 406 encapsulates information corresponding to a single custom property for the peripheral device 114 of FIG. 1.

Header section 400 stores information about the remaining portions of the extended property descriptor 122. Header section 400 includes the following fields:

dwLength—the total length of the extended property descriptor;

bcdVersion—the version number of the extended property descriptor;

wIndex—is used to identify this particular extended property descriptor.

wCount—the total number of control property entries 406 in the custom property section 402.

Using this information, an operating system or computer program application can parse the following custom property section 402.

Custom property section 402 is of variable size because it includes one or more custom property entries 406. Each control property section includes information that corresponds to a single custom property for the peripheral device 114 of FIG. 1. The custom property section includes the following fields:

dwSize—the total length of this particular custom property entry. (in one implementation, this includes header fields as well as name and property data.)

dwPropertyDataType—the data type of the data that is stored in the property data buffer (indicated below by bPropertyData field);

wPropertyNameLength—the size of the property name;

bPropertyName—the name of the property;

dwPropertyDataLength—the total size of the property data;

bPropertyData—the property data.

Example Property Descriptor Use

For an operating system to use a property descriptor stored on a device, the device must first provide information to the operating system that indicates that the device supports host-specific device requests. In this implementation, this is accomplished by storing the string descriptor shown in TABLE 1 at index 0xEE on the USB device. The string descriptor defines an operating system descriptor that is returned to the operating system in response to a USB device request as discussed above. In this implementation, the string descriptor index is 0xEE, however it could be stored at some other location in the USB device.

TABLE 1

Example of an Operating System String Descriptor

```
const byte os_descriptor[]={
    0x12,                              //length
    0x03,                              // string descriptor type
    _M_,_S_,_F_,_T_,_1_,_0_,_0_,       //data
    0x01,                              //index
    0x00                               //reserved
};
```

Next, the property descriptor is stored in a format specified by the operating system on the firmware of the USB device. The property descriptor is shown below in TABLE 2. In this implementation, the USB device is a USB compatible memory stick and the property descriptor defines a string property of the USB device.

TABLE 2

Example of a Property Descriptor for a USB Memory Stick Device

| | |
|---|---|
| const byte mem_stick_descriptor[]={ | //header section |
| 0x00000044, | // dwLength (DWORD) |
| 0x01000, | // bcdVersion |
| 0x0005, | // wIndex |
| 0x0001, | // wCount |
| | // custom property section |
| 0x0000003A, | // dwSize |
| 0x00000001, | // dwPropertyDataType |
| 0x0016, | // wPropertyNameLength |
| | //bPropertyName |
| _D_,_E_,_V_,_I_,_C_,_E_,_G_,_R_,_O_,_U_,_P_, | |
| 0x00000016, | //dwPropertyDataLength |
| | //bPropertyData |
| _M_,_E_,_M_,_O_,_R_,_Y_,_S_,_T_,_I_,_C_,_K_, | |
| }; | |

When the USB memory stick device is attached to the USB port on the computer, the operating system retrieves the property descriptor from the memory stick by using the following API call:

| | |
|---|---|
| GET_DESCRIPTOR( | |
| bmRequestType = 1100 0001B, | // device-to-host data transfer |
| bRequest = 0x01, | // this request |
| wValue = 0x0000, | // string descriptor indication |
| wIndex = 0x0005); | // identification for this descriptor |

More particularly, the USB device receives the GET_DESCRIPTOR device request and in response returns the property descriptor to the operating system. Upon receiving the property descriptor, the operating system extracts the GUI information to display special names, icons, URLs, and the like, to present a GUI that is appropriate for the device. By having this information present in the firmware of the USB device, a user only needs to attach the device to a host computer, rather than use additional installation media to obtain the GUI information.

CONCLUSION

Traditional systems and procedures typically require OEMs/IHVs to distribute installation media such as installation disks or setup programs with each USB device to specify device-specific UI information. In contrast to such traditional systems and procedures, the inventive concepts described above provide for the use of a host-specific device request to obtain device-specific UI information from a USB device. Thus, in contrast to such traditional systems and procedures, OEMs and IHVs that implement the host-specific device request for an extended property descriptor are not required to distribute installation media with each USB device to specify device-specific UI information.

Although the subject matter has been described in language specific to structural features and/or methodological steps, it is to be understood that the subject matter defined in the appended claims is not necessarily limited to the specific features or steps described. Rather, the specific features and steps are disclosed as preferred forms of implementing the claimed subject matter.

What is claimed is:

1. A method performed by a USB device, the method comprising:
receiving a host-specific device request from an application executing on a computing device coupled to the USB device;
identifying a host-defined string descriptor defined by the application, the host-defined string descriptor having a custom property section including custom property information corresponding to a custom property for the USB device, the custom property including user interface information of at least one of an icon, a picture, a help page, or a URL; and
transmitting the host-defined string descriptor, being stored in firmware of the USB device, to the application.

2. A method as recited in claim 1, wherein the custom property section includes one or more custom property entries having the custom property information.

3. A method as recited in claim 2, wherein the host-defined string descriptor includes a header section having an indication of a number of custom property entries for which mappings exist in the custom property section.

4. A method as recited in claim 1, wherein the application is an operating system.

5. A method as recited in claim 1, wherein the host-defined string descriptor comprises information in a data format specified by a host of the USB device.

6. A method as recited in claim 1, wherein the host-defined string descriptor comprises user interface elements for presentation by the application to a user for interfacing with the USB device.

7. A method comprising:
receiving a non-standard USB device request from a component of an operating system to provide an extended property of USB device interface data that is compatible with the component of the operating system; and
transmitting an extended property descriptor from the USB device that specifies the extended property, the extended property descriptor including a custom property section having custom property information for a user interface corresponding to a custom property for the USB device, the custom property including user interface information of at least one of an icon, a picture, a help page, or a URL.

8. A method as recited in claim 7, wherein the method further comprises:
augmenting, by the operating system, a shell or user interface at the remote computing device to represent the USB device.

9. A method as recited in claim 7, wherein the custom property section includes one or more custom property entries having the custom property information.

10. A method as recited in claim 9, wherein the extended property descriptor includes a header section having an indication of a number of custom properties property entries for which mappings exist in the custom property section.

11. A method as recited in claim 7, wherein the extended property descriptor includes user interface information corresponding to the USB device, the method further comprising:
providing information corresponding to the user interface information to one or more computer program applications responsive to transmitting the property descriptor.

12. A computer-readable storage medium containing computer-executable instructions utilized by an application program to interact with a USB device, wherein the computer-executable instructions comprise:
receiving a request from an application program for a property descriptor that specifies program interface information in a data format compatible with the application program and corresponding to the USB device, the program interface information having a custom property section including custom property information for a user interface corresponding to a custom property for the USB device, the custom property including user interface information of at least one of an icon, a picture, a help page, or a URL;

retrieving the property descriptor from the USB device using a host-specific device request; and providing the retrieved property descriptor to the requesting application program.

13. A computer-readable storage medium as recited in claim 12, wherein the computer-executable instructions further comprise instructions for:

augmenting, by the application program, a shell or user interface with the program interface information for presentation to a user.

14. A computer-readable storage medium as recited in claim 12, wherein the retrieved property descriptor includes one or more custom property sections having custom property information.

15. A computer-readable storage medium as recited in claim 12, wherein the retrieved property descriptor includes a header section indicating the a number of custom properties for which mappings exist in the property descriptor.

16. A computer-readable storage medium as recited in claim 12, wherein the program interface information is selected from information comprising an icon, a font, a picture, a label, a help page, or a URL.

17. A computer comprising one or more computer-readable media as recited in claim 12.

18. A method as recited in claim 12, wherein the program interface information is in a data format specified by a host of the USB device.

19. A method as recited in claim 18, wherein the host is an operating system.

* * * * *